Patented May 27, 1924.

1,495,308

UNITED STATES PATENT OFFICE.

JAMES M. JENNINGS, OF ELIZABETH, NEW JERSEY, ASSIGNOR TO STANDARD DEVELOPMENT COMPANY, A CORPORATION OF DELAWARE.

COMPOSITION OF MATTER FOR FOAMS.

No Drawing. Application filed May 7, 1923. Serial No. 637,375.

*To all whom it may concern:*

Be it known that I, JAMES M. JENNINGS, a citizen of the United States, residing at Elizabeth, in the county of Union and State of New Jersey, have invented new and useful Improvements in the Composition of Matter for Foams, of which the following is a specification.

This invention relates to foams and foam producing compositions and more particularly to foams for use upon the surfaces of liquids containing volatile constituents, for preventing evaporation thereof, along the lines presented in U. S. Patent No. 1,443,538.

The body-forming material for the preparation of a foam in accordance with the present invention is a protein of other than albuminoid type, for example casein, in the amount of about 1-6%. Corn-starch or an equivalent (including modified starches, for example acid-treated starches, and gums) is also incorporated in the amount of 5-15%, and glycerin, preferably soap-makers' glycerin, to the amount of 5-30%. For some uses the glycerin may be substituted in whole or in part by glucose or blackstrap molasses. The fluent quality of the foam may be improved somewhat by the addition of ¼ to 2% of a soluble sulfonic compound, such as sodium sulfonate. A suitable setting agent, such for example as ferrous sulfate is added in amount of 0.1-1% according to the desired degree of fluency or of set desired in the foam. Where the commercial form of casein known as casein glue is used, technical calcium chlorid in amount of 5-6% may be also incorporated to advantage.

A suitable antiseptic, for example borax 0.1-2%, or mercuric chlorid to the amount of about 0.1% may be added if desired.

An example of a foam composition prepared in accordance with the present invention is as follows:

Casein 5%, glycerin 25%, glucose 50%, cornstarch 10%, ferrous sulfate 0.1%, sodium sulfonate 1%, borax 1%, water 7.9%.

The ferrous sulfate is dissolved in a small portion of the water, and to the balance is then added the borax, the casein and the sodium sulfonate; the cornstarch is mixed with the glycerin and glucose and all the liquids are brought together, the ferrous sulfate solution preferably being added last, and the mixture is beaten and whipped to a fine textured smooth foam.

An example of a composition where the commercial casein known as casein glue is used is as follows:

Casein glue 3%, borax 1%, glucose 50%, glycerin 24%, cornstarch 10%, sodium sulfonate 1%, technical calcium chlorid 5.5%, ferrous sulfate 0.1%, water 5.4%.

I claim:

1. A foam for the prevention of evaporation, having as its base a liquid containing casein 1-6%, cornstarch 5-15%, glycerin and glucose together not exceeding 75%, borax 0.1-2%, sodium sulfonate ¼-2%, ferrous sulfate 0.1-1%, and water 5-10%.

2. A foam for the prevention of evaporation, having as its base a liquid containing casein 1-6%, starch 5-15%, glycerin, glucose, a setting agent and water.

3. A foam for the prevention of evaporation, having as its base a liquid containing casein glue, starch 5-15%, glucose, calcium chlorid, a setting agent and water.

4. A liquid base for foams for the prevention of evaporation, containing casein 1-6%, cornstarch 5-15%, glycerin and glucose together not exceeding 75%, borax 0.1-2%, sodium sulfonate ¼-2%, ferrous sulfate 0.1-1% and water 5-10%.

5. A liquid base for foams for the prevention of evaporation, containing casein 1-6%, starch 5-15%, glycerin, glucose, a setting agent, a preservative and water.

6. A liquid base for foams for the prevention of evaporation, containing casein glue, starch 5-15%, glucose, calcium chlorid, a setting agent and water.

JAMES M. JENNINGS.